(12) United States Patent
Hanes et al.

(10) Patent No.: US 8,619,586 B2
(45) Date of Patent: Dec. 31, 2013

(54) SYSTEM AND METHOD FOR PROVIDING TROUBLESHOOTING IN A NETWORK ENVIRONMENT

(75) Inventors: M. David Hanes, Lewisville, NC (US); James C. Frauenthal, Colts Neck, NJ (US); Michael P. Obrien, Manasquan, NJ (US)

(73) Assignee: Cisco Technology, Inc., San Jose, CA (US)

( * ) Notice: Subject to any disclaimer, the term of this patent is extended or adjusted under 35 U.S.C. 154(b) by 410 days.

(21) Appl. No.: 12/579,510

(22) Filed: Oct. 15, 2009

(65) Prior Publication Data
US 2011/0090798 A1  Apr. 21, 2011

(51) Int. Cl.
*G01R 31/08* (2006.01)

(52) U.S. Cl.
USPC ............................. 370/241; 370/235; 709/223

(58) Field of Classification Search
USPC ......... 370/241, 242, 248, 249, 250, 252, 231, 370/232, 233, 234, 235, 243, 245, 253; 709/223
See application file for complete search history.

(56) References Cited

U.S. PATENT DOCUMENTS

| | | |
|---|---|---|
| 4,506,358 A | 3/1985 | Montgomery |
| 4,769,810 A | 9/1988 | Eckberg, Jr. et al. |
| 4,769,811 A | 9/1988 | Eckberg, Jr. et al. |
| 4,922,486 A | 5/1990 | Lidinsky et al. |
| 5,327,421 A | 7/1994 | Hiller et al. |
| 5,345,445 A | 9/1994 | Hiller et al. |
| 5,345,446 A | 9/1994 | Hiller et al. |
| 5,365,524 A | 11/1994 | Hiller et al. |
| 5,390,175 A | 2/1995 | Hiller et al. |
| 5,867,485 A | 2/1999 | Chambers et al. |
| 5,933,490 A | 8/1999 | White et al. |
| 6,011,790 A | 1/2000 | Fisher |
| 6,111,853 A | 8/2000 | Goodman |
| 6,154,448 A | 11/2000 | Petersen et al. |
| 6,259,677 B1 | 7/2001 | Jain |

(Continued)

OTHER PUBLICATIONS

Cisco Systems, Inc., "Fundamental Cisco Unified Border Element Configuration, Configuring a TRP Loopback Interface," Cisco Unified Border Element Configuration Guide, Release 12.4T; Mar. 19, 2010; http://www.cisco.com/en/US/docs/ios/voice/cube/configuration/guide/vb-gw-config_ps6441_TSD_Products_Configuration_Guide_Chapter.html#wp1373517; 4 pgs.

(Continued)

*Primary Examiner* — Awet Haile
(74) *Attorney, Agent, or Firm* — Patent Capital Group (57) ABSTRACT

An example method is provided and includes identifying a change in header information within a packet of a communication flow. The change in header information reflects a predetermined type of header change that signifies a degradation condition for the communication flow. The method also includes changing a header field within an outgoing frame to initiate a trace through a network path. Diagnostic data associated with the communication flow can be collected. In more particular embodiments, the changing of the header field includes changing an Ethernet header field for a layer two frame, or changing an Internet Protocol (IP) header field for a layer three frame. Changing of the header field can also include changing a field within an outgoing layer three header to identify an IP socket associated with the communication flow. The change to the header field can be propagated by network elements along the network path.

19 Claims, 4 Drawing Sheets

(56) References Cited

U.S. PATENT DOCUMENTS

| | | | |
|---|---|---|---|
| 6,259,695 B1 | 7/2001 | Ofek | |
| 6,292,479 B1 | 9/2001 | Bartholomew et al. | |
| 6,292,651 B1 | 9/2001 | Dappes et al. | |
| 6,400,720 B1 | 6/2002 | Ovadia et al. | |
| 6,404,740 B1 | 6/2002 | Yoshida | |
| 6,466,548 B1 | 10/2002 | Fitzgerald | |
| 6,580,723 B1 | 6/2003 | Chapman | |
| 6,973,042 B1 | 12/2005 | Fitzgerald | |
| 7,072,305 B1 | 7/2006 | Gregson et al. | |
| 7,400,637 B1 | 7/2008 | Chapman | |
| 7,436,776 B2* | 10/2008 | Koga | 370/246 |
| 7,519,004 B1 | 4/2009 | Kamity et al. | |
| 7,870,590 B2* | 1/2011 | Jagadeesan et al. | 725/93 |
| 7,940,665 B2* | 5/2011 | Singh et al. | 370/235 |
| 2005/0163117 A1 | 7/2005 | Rhim et al. | |
| 2005/0220033 A1 | 10/2005 | DelRegno et al. | |
| 2005/0243733 A1 | 11/2005 | Crawford et al. | |
| 2006/0045021 A1 | 3/2006 | Deragon et al. | |
| 2006/0104207 A1 | 5/2006 | Ostrosky | |
| 2006/0268718 A1 | 11/2006 | Jones | |
| 2007/0081538 A1* | 4/2007 | Ganji | 370/394 |
| 2008/0069002 A1* | 3/2008 | Savoor et al. | 370/241 |
| 2008/0101241 A1 | 5/2008 | Mohan et al. | |
| 2008/0175162 A1 | 7/2008 | Wing et al. | |
| 2008/0192763 A1* | 8/2008 | Davis et al. | 370/412 |
| 2008/0273465 A1* | 11/2008 | Gusat et al. | 370/236 |
| 2008/0285463 A1 | 11/2008 | Oran | |
| 2008/0304420 A1 | 12/2008 | Deragon et al. | |
| 2009/0129557 A1 | 5/2009 | Carter et al. | |
| 2009/0161565 A1 | 6/2009 | Reniere et al. | |
| 2009/0193506 A1 | 7/2009 | McGrew et al. | |
| 2009/0234940 A1 | 9/2009 | Pal et al. | |
| 2010/0034109 A1* | 2/2010 | Shomura et al. | 370/252 |
| 2010/0138885 A1 | 6/2010 | Haimi-Cohen | |
| 2010/0188989 A1 | 7/2010 | Wing et al. | |
| 2011/0019551 A1* | 1/2011 | Adams et al. | 370/235 |

OTHER PUBLICATIONS

Cisco Systems, Inc., "Session Through sgcp tse payload, Session Target (VoIP Dial peer)," Cisco IOS Voice Command Reference; [printed Jun. 20, 2010] http://www.cisco.com/en/US/docs/ios/voice/command/reference/vr_s02.html-wp1269379; 5 pgs.

Hedayat, K., et al., "An Extension to the Session Description Protocol (SDP) for Media Loopback," Oct. 7, 2009; http://tools.ietf.org/id/draft-ietf-mmusic-media-loopback-11; 36 pgs.

Schulzrinne, H., et al., "RTP Payload for DTMF Digits, Telephony Tones and Telephony Signals," Network Working Group, RFC 2833, May 2000; http://tools.ietf.org/pdf/rfc2833.pdf; 31 pgs.

Schulzrinne, H., et al., "RTP Profile for Audio and Video Conferences with Minimal Control," Network Working Group, RRC 3551, Jul. 2003; http://tools.ietf.org/pdf/rfc3551.pdf; 38 pgs.

U.S. Appl. No. 12/879,910, filed Sep. 10, 2010 entitled "System and Method for Determining and Controlling Loopback Points in a Network Environment"; Inventor(s): M. David Hanes, et al.

USPTO Apr. 5, 2011 Final Rejection from U.S. Appl. No. 12/360,247.

Jul. 1, 2011 Response to USPTO Final Rejection dated Apr. 5, 2011 from U.S. Appl. No. 12/360,247.

Cisco Systems, Inc., "Cisco Visual Quality Experience: Product Overview," © 2009; 11 pages http://www.cisco.com/en/US/prod/collateral/video/ps7191/ps7127/product_data_sheet0900aecd806c0bfb.html.

T. Friedman et al., "RTP Control Protocol Extended Reports (RTCP XR)," Network Working Group, RFC 3611, Nov. 2003, 52 pages, http://www.ietf.org/rfc/rfc3611.txt.

U.S. Appl. No. 12/360,247, filed Jan. 27, 2009, entitled "Monitoring of Real-Time Transport Protocol (RTP) Packet Flow Along RTP Path," Inventors: Daniel Wing and Ali Begen.

USPTO Dec. 29, 2011 Non-Final Office Action from U.S. Appl. No. 12/360,247.

USPTO Mar. 27, 2012 Response to Dec. 29, 2011 Non-Final Office Action from U.S. Appl. No. 12/360,247.

USPTO Apr. 27, 2012 Notice of Allowance from U.S. Appl. No. 12/360,247.

USPTO Sep. 12, 2012 Non-Final Office Action from U.S. Appl. No. 12/879,910.

USPTO Dec. 13, 2012 Response to Sep. 12, 2012 Non-Final Office Action from U.S. Appl. No. 12/879,910.

USPTO Feb. 27, 2013 Final Office Action from U.S. Appl. No. 12/879,910.

USPTO May 28, 2013 RCE Response to Feb. 27, 2013 Final Office Action from U.S. Appl. No. 12/879,910.

USPTO Jul. 2, 2013 Non-Final Office Action from U.S. Appl. No. 12/879,910.

* cited by examiner

SYSTEM AND METHOD FOR PROVIDING TROUBLESHOOTING IN A NETWORK ENVIRONMENT

TECHNICAL FIELD

This disclosure relates in general to the field of communications and, more particularly, to providing troubleshooting in a network environment.

BACKGROUND

Network architectures have grown increasingly complex in communication environments. The ability to troubleshoot the degradation of flows in networks presents a formidable task. This analysis is particularly troublesome when multiple network carriers are implicated in the network, or when the call control and media flows take divergent paths through the network. Tracing activities can be used to follow media streams as they propagate in the network. As voice, video, and other applications continue to be deployed in the network, tracing activities for media streams becomes important. Efficient tracing of a media stream can reveal diagnostic information, system faults, and various other conditions that may be of interest to network operators, network carriers, device manufacturers, and network administrators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method is provided and includes identifying a change in header information within a packet of a communication flow. The change in header information reflects a predetermined type of header change that signifies a degradation condition for the communication flow. The method also includes changing a header field within an outgoing frame to initiate a trace through a network path. Diagnostic data associated with the communication flow can be collected. In more particular embodiments, the changing of the header field includes changing an Ethernet header field for a layer two frame associated with the communication flow, or changing an Internet Protocol (IP) header field for a layer three frame associated with the communication flow. Changing of the header field can also include changing a field within an outgoing layer three header to identify an IP socket associated with the communication flow. The change to the header field can be propagated by at least some network elements along the network path associated with the communication flow.

Example Embodiments

Figure 1A:
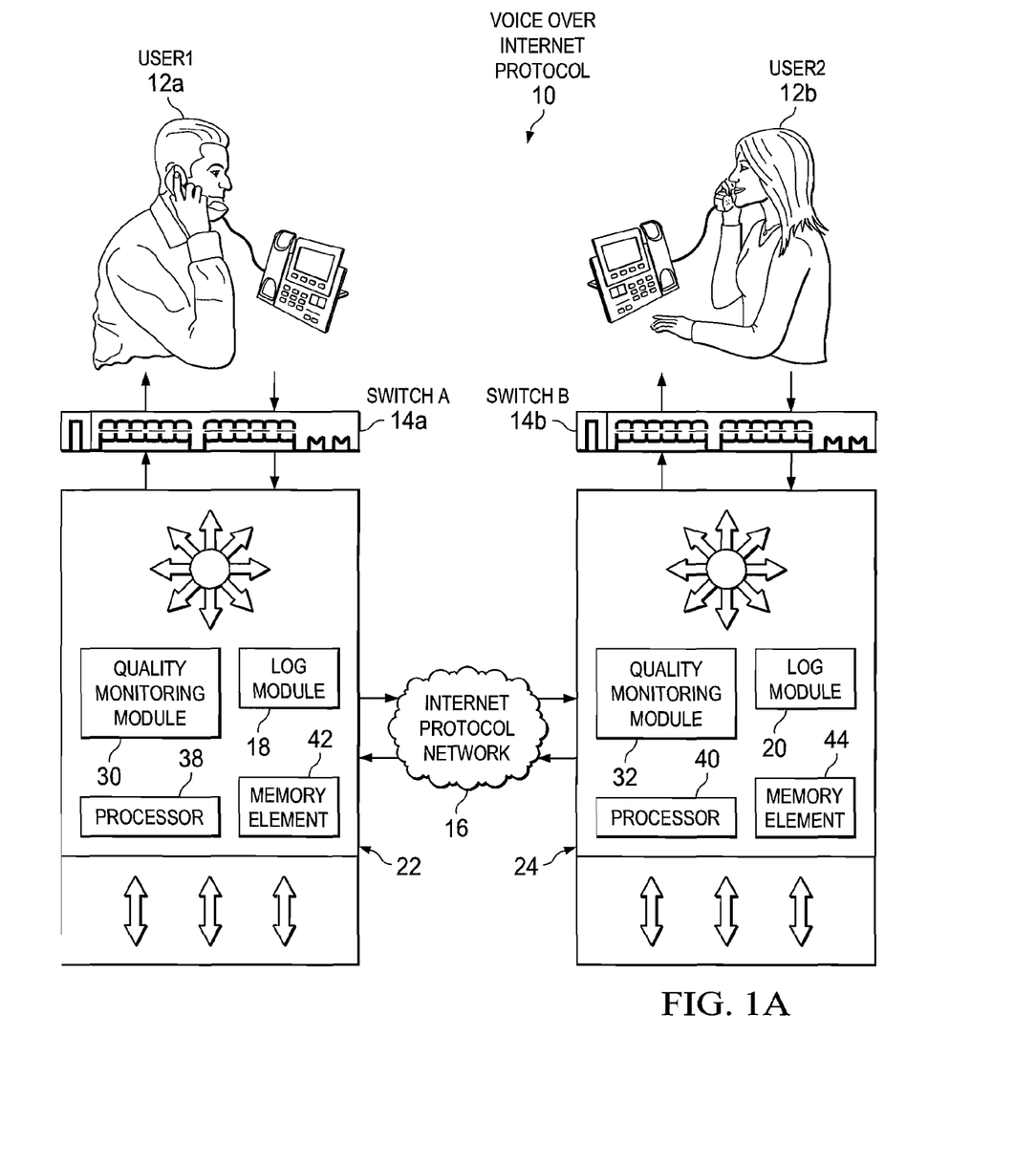
FIG. 1A is a simplified block diagram of a communication system for providing troubleshooting in a network environment in accordance with one embodiment of the present disclosure.

Turning to FIG. 1A, FIG. 1A is a simplified block diagram of a communication system 10 for troubleshooting network degradation issues. Communication system 10 may include a first user 12a and a second user 12b. For simplification, these users are identified as User 1 and User 2 respectively. In addition, in the context of the example of FIG. 1A, User 1 is talking over a voice over Internet Protocol (VoIP) network to User 2, where both users are employing IP telephones in this particular example. FIG. 1A also includes a set of switches 14a-b, an IP network 16, and a set of routers 22 and 24. Router 22 may include a quality monitoring module 30, a log module 18, a processor 38, and a memory element 42. In a similar fashion, router 24 may include a quality monitoring module 32, a log module 20, a processor 40, and a memory element 44.

Communication system 10 can offer mechanisms for real-time flow troubleshooting of an IP media stream. Note that in certain example implementations, header bits of the actual media stream packets can be manipulated at layer 2 (L2) and layer 3 (L3) in order to signal devices associated with the media stream. Routers and switches systematically evaluate L2 and L3 header information as part of their routine operations. Therefore, directing these devices to act upon additional bits within the header does not create excess overhead, or create a burdensome responsibility for such devices. Further, these devices can be employed to analyze and to map the L3 and L2 signaling bits between L3 and L2 headers. This mapping can ensure that both L3 and L2 transit devices (sitting in the actual media stream) can be signaled about degradation issues. Furthermore, new protocols do not need to be developed to implement this quality monitoring mechanism because the tracing activities can be conducted via L2 and L3 packet header elements. Once degradation issues have been suitably identified (both downstream and upstream) within the network through an intelligent detection of a specific L2 or L3 packet header identifier, the transit devices implicated in a pathway involving the media stream can be signaled about the possible deterioration of their particular flows. Note that in identifying particular media streams associated with degradation issues, a socket can be identified. The socket can include an IP address/port pairing, which is typically used to identify media streams. Thus, unique media streams can be identified via a particular IP socket. In other instances, the media streams can be identified through various other mechanisms, tools, or protocols.

For purposes of illustrating some example techniques of communication system 10, it is important to understand the media stream communications that may be traversing the network and which may necessitate troubleshooting. The following foundational information may be viewed as a basis from which the present disclosure may be properly explained. As a general proposition, VoIP communications can suffer from corruption issues, as data traverses network infrastructure (e.g., gateways, switches, routers, etc.). In voice or video applications, endpoint devices that use codecs are commonly employed to monitor packet flows. When sequence numbers are incorrect, or when packets (or frames) are absent for a media stream, the codecs understand that they are missing certain information. The codecs can typically identify how many packets are missing, if the packets have arrived late, if the packets are departing from expected inter-arrival times, etc. Impairments can be seen in the form of jitter, packet loss, latency, etc. As used herein in this Specification, the terminology "degradation condition" encompasses all of these network characteristics, as well as other issues that can inhibit the effective propagation of packets in a network.

Troubleshooting a stream of real-time media packets through large IP networks is a complex and time-consuming task. Various routers and switches (along with endpoints associated with any media stream origination and/or termination) can be deployed on a pathway in which media streams propagate. Degradation conditions can negatively affect those media streams. Naturally, the act of pinpointing and troubleshooting these degradation conditions increases in complexity, as more devices are placed on the media stream pathway. For example, in a wide area network (WAN) architecture, the network has an enterprise tie to a larger network, which is typically the network carrier. Enterprise networks (e.g., corporate networks) have grown in complexity and, further, their sophistication can create a significant challenge in trying to specifically identify degradation issues (e.g., an overloaded router, an overrun buffer, central processing unit (CPU) cycles running at high rates, etc.). In a worst-case scenario, individual connections between all of the devices in the media stream path have to be evaluated before a network problem could be properly diagnosed. Specifically, ingress and egress queues that are used by the real-time media stream can be checked for packet drops and/or excessive delay. Other statistics being evaluated by these network devices can include packet loss, jitter, and delay for the real-time stream. Such individualized approaches would be virtually impossible to implement and, further, remedial and reporting activities would be pointless because of the inability to diagnose degradation conditions efficiently.

In contrast to these flawed operations, communication system 10 can offer a real-time media troubleshooting process and, further, can signal routers and switches (upstream in the network) when a significant degradation occurs. Diagnostic information can be sent in real-time, where the system can appropriately trigger a media troubleshooting process via any suitable manner (e.g., using an endpoint user control, using a self-diagnostic trigger that is based on packet statistics, using an automated mechanism that is triggered when certain thresholds are met, etc.).

In one example implementation, communication system 10 can manipulate the existing frame and packet header information of the media stream elements to signal routers and switches of degradation conditions. The L3 and L2 devices in the media path are capable of understanding the manipulated header information and, further, can use this information to activate monitoring or tracing for the media stream that is identified. The architecture can provide an efficient mechanism for signaling routers and switches to begin collecting data on a specific media stream. In addition, by using L2 and L3 header changes, routers and switches do not need dedicated (i.e., special) resources for detecting the incoming troubleshooting signals. In addition, in the context of ensuring reliability in customer networks, the architecture can provide a feature within a smart call home service to enable real-time troubleshooting diagnostic collection, as outlined herein.

When operating in conjunction with IP phones, communication system 10 can further provide users with real-time diagnostic control by allowing an IP phone to initiate diagnostic collection activities (e.g., after monitoring incoming packet statistics). This could include a button configured on the phone itself, or it could include software, or some other mechanism for providing this control (or trigger). In addition, such a diagnostic collection tool can offer an automated method for efficiently gathering troubleshooting data, which can be used to alert management components in the event that media stream flaws are detected. In addition, the quality monitoring operations can provide specific troubleshooting diagnostic information by analyzing specific media stream data. This specificity narrows the focus of the troubleshooting process, which saves valuable time for management components tasked with reporting and/or resolving network problems. This more granular analysis engenders the ability to trace a call (i.e., a media stream) through a large complex network. Hence, large complex networks, which would otherwise be difficult to troubleshoot, can be efficiently managed.

In another example implementation involving a TelePresence Multipoint network (where audio and video media streams are propagating), the media tracing and quality monitoring mechanism can be provided to offer the same real-time troubleshooting process. The signaling can be triggered by users at the endpoint devices or by the endpoint devices themselves, which can detect poor audio or video quality (e.g., evidenced by continual packet loss events). In networks where a centralized call agent (CA) is present, the troubleshooting features outlined herein could be more compelling. For example, in these CA-controlled networks, the call control protocols (i.e., H.323, session initiation protocol (SIP), media gateway control protocol (MGCP), skinny client control protocol (SCCP), etc.) are responsible for setting up the IP media stream flowing through a call agent, where the IP media stream can take any number of paths. Mechanisms outlined herein can focus on the IP media stream and the path being taken through any number of network devices. Thus, the troubleshooting approaches outlined herein could be ideal for identifying IP media stream problems in call agent scenarios.

In operation, quality monitoring module 30 can be used to execute the troubleshooting process, as outlined below. In more specific implementations, quality monitoring module 30 can be involved in a voice quality assurance protocol that monitors media streams propagating in the network. Based on certain criteria that can be predetermined, quality monitoring module 30 can initiate a process associated with reporting, updating, archiving, storing, or otherwise identifying the degradation conditions occurring in the network. In one particular example, quality monitoring module 30 may be included within a router, which is tasked with routing packets in a network environment. In other instances, quality monitoring module 30 may be provided in a switch (e.g., closer to a distribution point in the network) to carry out these activities. For example, quality monitoring module 30 can include the intelligence to signal (e.g., to components on the data pathway) that some type of problem is occurring in the network. In response to the signaling, the components can send their diagnostic data to a log file or to a centralized management system. In one example, the degradation activity can be reported to respective log modules 18 and 20. The report can include granular information about the flows being implicated, the specific times at which the activity occurred, the packet characteristics, the specific devices involved, the device statistics (e.g., buffer status, CPU status, etc.), the particular networks in which the activity occurred, the individual network carriers involved, etc. As used herein in this Specification, the term 'diagnostic data' encompasses any such information, as well as other data segments, which may be of interest to particular systems, devices, or administrators. In other instances, this information can be reported to a central server (e.g., a syslog server), to a central management system, to an administrator module, or to any other suitable destination, which may be based on particular needs. Note that in certain instances, individual carriers may have their own log elements for recording this information.

Before turning to additional operations of this architecture, a brief discussion is provided about some of the infrastructure of FIG. 1A. Users 12a-b can be associated with clients or customers wishing to initiate a communication in communication system 10 via some network. The term 'user' is inclusive of devices used to initiate a communication, such as an IP phone, a computer, a personal digital assistant (PDA), a laptop or electronic notebook, a cellular telephone, an iPhone, or any other device, component, element, or object capable of initiating voice, audio, video, or data exchanges within communication system 10. This may also be inclusive of a suitable interface to the human user, such as a microphone, a display, or a keyboard or other terminal equipment. This may also include any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

IP network 16 represents a series of points or nodes of interconnected communication paths for receiving and transmitting packets of information, which propagate through communication system 10. IP network 16 can offer a communicative interface between routers, switches, servers (and/or endpoints) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment. IP network 16 can implement a TCP/IP communication language protocol in a particular embodiment of the present disclosure; however, IP network 16 may alternatively implement any other suitable communication protocol for transmitting and receiving data packets within communication system 10.

Routers 22 and 24 are network elements that facilitate communication flows between endpoints and a given network (e.g., for networks such as those illustrated in FIG. 1A). As used herein in this Specification, the term 'communication flow' is meant to encompass any packet exchange (e.g., data, voice, video, media, etc.) that occurs in a network environment. As used herein in this Specification, the term 'network element' is meant to encompass network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information to facilitate the troubleshooting operations discussed herein.

Each of routers 22 and 24 may include a quality monitoring module 30 and 32 (respectively) in order to provide efficient troubleshooting operations, as detailed herein. Moreover, the network elements may include any suitable hardware, software, components, modules, interfaces, or objects that facilitate the operations thereof. This may be inclusive of appropriate algorithms and communication protocols that allow for the effective exchange of data or information. In other embodiments, this feature may be provided externally to routers 22 and 24 or included in some other network device to achieve this intended functionality. Alternatively, network elements (e.g., routers 22 and 24) can include reciprocating software that can coordinate in order to achieve the troubleshooting operations, as outlined herein. In still other embodiments, one or both of these devices may include any suitable algorithms, hardware, software, components, modules, interfaces, or objects that facilitate the operations thereof. Additional details related to the functions of routers 22 and 24 are provided below with reference to FIG. 1C.

Figure 1B:
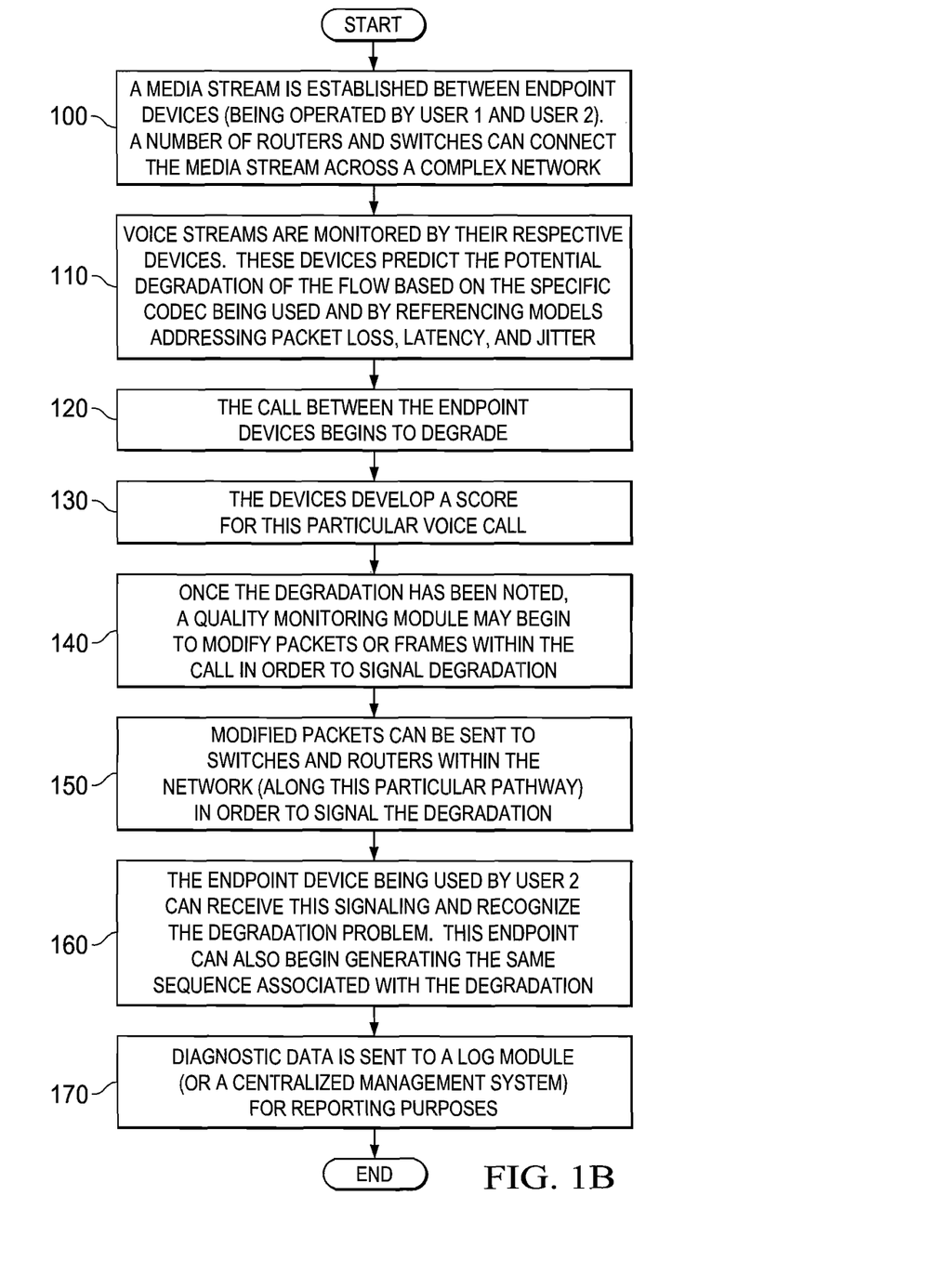
FIG. 1B is a simplified flow diagram illustrating a series of example steps associated with the communication system.

Turning briefly to FIG. 1B, FIG. 1B is a simplified flow diagram illustrating example steps associated with communication system 10. At step 100, a media stream is established by an endpoint device, such as an IP phone, a gateway, a TelePresence console, or any other suitable device. A number of routers and switches can connect the media stream across a complex network. In this example, User 1 is talking to User 2 over a VoIP media stream, and the devices being used by the users are VoIP telephones. There are numerous algorithms (e.g., International Telecommunication Union (ITU) recommended algorithms) that can monitor voice streams (or media streams) in real-time. These mechanisms are generally non-intrusive, as they passively monitor sequence numbers and look for packet loss, jitter, latency, etc. Additionally, they also consume minimal CPU processing cycles.

At step 110, voice streams are monitored by their respective devices. These devices can predict the potential degradation of the flow based on the specific codec being used and by referencing models addressing packet loss, latency, and jitter. In this particular flow, the call begins to degrade at step 120. The devices can develop a score for this particular voice call. In one example implementation, a mean opinion score (MOS) is generated for the call. This is illustrated at step 130. The MOS can provide a numerical indication of the perceived quality of received media (e.g., after compression and/or transmission). The MOS can be expressed as a single number in the range of 1-5, where 1 is lowest perceived audio quality, and 5 is the highest perceived audio quality measurement. The score can be used to make a judgment as to whether the degradation is sufficient to trigger the quality monitoring process. In a particular example, a soft key could be provided to a specific device such that a given user could manually trigger the quality monitoring process. In other instances, the process could be triggered in an automated manner, which would not require active involvement from the user.

Once the degradation has been noted, quality monitoring module 30 may begin to modify select fields in the packet or frame headers of these corresponding elements in the flow in order to signal the flow degradation. This is reflected by step 140. These modified packets or frames can be propagated (by the network elements) through the network, along this particular pathway, in order to signal the degradation to other upstream devices. This is reflected by step 150. Thus, the signal can be sent (e.g., in the form of protocol changes in a given header). For L2 frames, this could involve an Ethernet type field, and for L3 frames this could involve an IP header field associated with the protocol.

It is imperative to note that the preceding paragraph describes activity for determining when an endpoint elects to start the troubleshooting process. This is merely one possible method (of many) that could be employed. In more generalized scenarios, instead of focusing on a potential score, simple statistics for a packet can be used to render a decision to start the troubleshooting process. Quality monitor module 30 can be configured on a router, and it is capable of noticing the degradation initially. The triggering activity could depend on thresholds being designated; however, a more likely scenario is that the user, or the endpoint IP phone, could determine that degradation is present. Thus, quality monitoring module 30 could readily be provisioned at a switch, an IP phone, or any other suitable location for detecting such degradation. For example, an IP phone could be the first device to modify headers in the IP flow to signal the other devices in the stream to collect diagnostic information. Quality monitoring processes can equally be provided at the endpoints (and at endpoint devices), but also could be provisioned elsewhere in the network (e.g., in a router/switch). Thus, a phone, a process, or a person could decide when quality is sufficiently bad to initiate the media tracing process.

Routers and switches systematically evaluate incoming frames. As these devices continue to evaluate these frames, they are not departing from their normal routine operations. When the protocol type (of a packet within a media stream) equals some designated value (e.g., configured by an administrator, device manufacturer, or network operator), signaling can be triggered to insert that same value in outgoing packets to be delivered to the next hop device along the media stream path. Each receiving router and switch can make these header changes in the upstream direction, as the network begins to converge. In one instance, the header change is not arbitrary; it represents a valid header change that is recognizable by other elements in the network. For example, a predetermined type of header change could be employed, where network elements in the media path have the intelligence to recognize/identify a specific header change. This could trigger a certain response from these elements, such as a modification of outgoing packets.

Thus, an endpoint device used by User 2 can receive this signaling and recognize the degradation problem. That endpoint can also begin generating the same sequence associated with the degradation in the reverse direction. This is depicted by step 160. Each device in the media stream path that observes this signaling (packet/frame header changes) within a particular flow, understands that diagnostic data related to that flow should be gathered. At step 170, this diagnostic data for each transit device and endpoint is sent to a log module (or a centralized management system) for reporting purposes, and/or analysis to determine the cause and the location of the degradation.

Figure 1C:
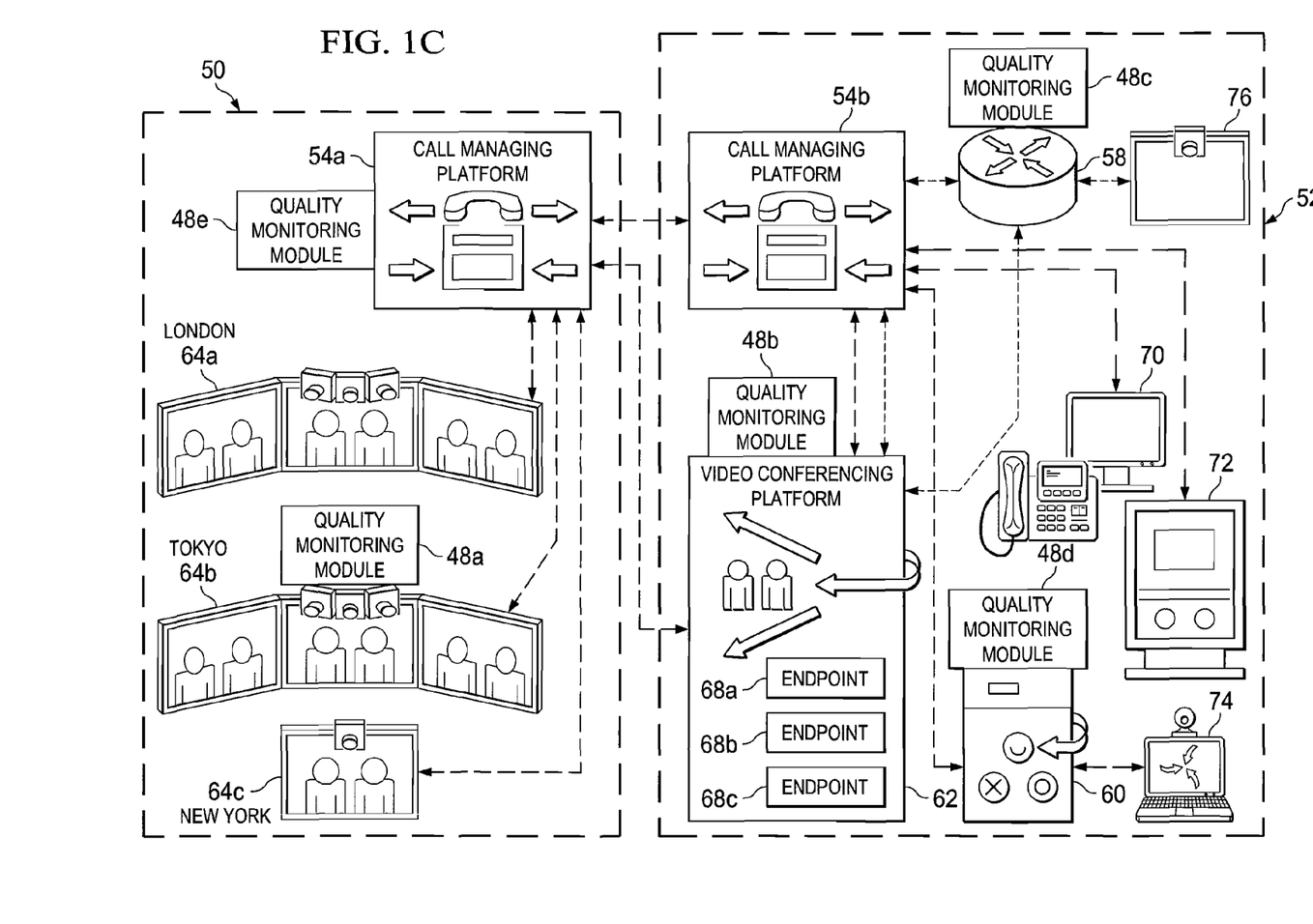
FIG. 1C is a simplified block diagram of another embodiment of a communication system for providing troubleshooting in a network environment.

Turning to technical details related to the quality monitoring features, FIG. 1C is a simplified block diagram showing an architecture that can be used in conjunction with the concepts explained in the present disclosure. FIG. 1C may include a number of media streams that can be received/transmitted/processed by routers, switches, video platforms, and endpoints that cooperate in order to facilitate the propagation of media stream flows. It should also be noted that many video conferencing scenarios involve participants internationally and, in such instances, video degradation is commonly prevalent. This can be particularly troublesome in scenarios involving bandwidth restrictions, where media communications suffer from large amounts of jitter and packet loss.

There are two logical segments 50 and 52 in FIG. 1C and these help to illustrate the various types of media streams that could be accommodated by the teachings of the present disclosure. On the left-hand side of FIG. 1C, there is a call managing platform 54a, which has logical connections to various video endpoints 64a-c (e.g., representing endpoints in London, Tokyo, and New York). Any type of routing devices associated with the logical connections can be leveraged in order to offer the quality monitoring operations explained herein. This can involve changing selected fields within specific packet headers and frame headers in both L2 and L3 streams.

On the right-hand side of FIG. 1C, a call managing platform 54b is depicted as having logical connections to a router 58, a routing element 60 (which may include enhanced call managing functions for multiple end users), a video conferencing platform 62 (having logical connections to multiple endpoints 68a-c), a video telephony device 70, a videophone 72, a laptop 74, and a video conferencing element 76. Video conferencing element 76 may be capable of performing various call control protocols such as H.323, H.320, etc. FIG. 1C also includes a number of quality monitoring modules 48a-e, which may operate in a fashion similar to that described above with respect to FIG. 1A. Quality monitoring modules 48a-e are depicted as being logically coupled (or included within) the devices shown in FIG. 1C. Other arrangements are clearly within the broad scope of the present disclosure, as FIG. 1C is merely representing possible scenarios (or potential deployments of the quality monitoring modules) involving the troubleshooting of media streams.

In operation, if any of the endpoints of FIG. 1C begin experiencing packet degradation that affects the quality of their associated media stream, individuals can initiate a real-time troubleshooting process by pressing a soft-key on their respective devices. Alternatively, if the network elements are so enabled, when significant packet degradation is detected, the network elements can automatically initiate a real-time troubleshooting process through their respective quality monitoring module. In one example, tracing can occur for a media stream, which can be separate from the call control through different networks. As part of this tracing function, a quality monitoring module can initialize troubleshooting procedures on the transit devices. In a different example, call managing platform 54a (potentially operating in conjunction with quality monitoring module 48e) can enable this real-time troubleshooting feature by device pool, per-phone, etc.

In one instance, a trigger for media stream tracing and troubleshooting can be achieved by setting thresholds in the endpoints (IP phones, voice gateways, routers, switches, etc.) so that if a certain percentage of packet loss (or any other measurement) is detected, then these elements can automatically signal the tracing and troubleshooting operation. If a non-IP phone were included in the media stream (e.g., interconnected through a gateway), the real-time troubleshooting process could be initiated, for example, using a unique dual tone multi-frequency (DTMF) dialing pattern. This could include the asterisk (*) and the number (#) keys on either a non-IP phone, or an IP phone. The real-time troubleshooting process could also be defined so that it is enabled by a network manager (e.g., after receiving some type of alert).

In one particular embodiment, a router or a switch can be empowered to perform the media tracing and troubleshooting described herein via an operating system command (e.g., via an Internetwork operating system (IOS) command) provisioned within particular devices. For example, the command mechanism can be inserted on specific interfaces, or on specific ports of devices configured to route data in a network. The commands can inform their corresponding devices that when receiving packets with the header changes as explained herein, the devices should react in a certain manner. For example, one response may include gathering and/or delivering certain logistical information to some type of central network management system or logging component. Along similar reasoning, a log server could be configured within the operating system for receiving information associated with these activities.

In one example implementation, router 22 and/or router 24 include software in order to achieve the troubleshooting (and/or reporting) functionality outlined herein. These activities can be facilitated by quality monitoring modules 30 and 32. In other examples, this software could be provided at various other locations within the network, or included as part of a proprietary element, which could be provided in (or be proximate to) these identified network elements. Thus, in other embodiments, these features may be provided externally to routers 22 and 24, or be included in some other network device, or in a computer to achieve these intended functionalities.

Note that in certain example implementations, the troubleshooting functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 1A] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 1A] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In certain example configurations, both routers 22 and 24 can include memory elements (as shown in FIG. 1A) for storing information to be used in achieving the quality monitoring operations as outlined herein. Additionally, each of these devices may include a processor (as shown in FIG. 1A) that can execute software or an algorithm to perform the troubleshooting and/or signaling activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Figure 2:
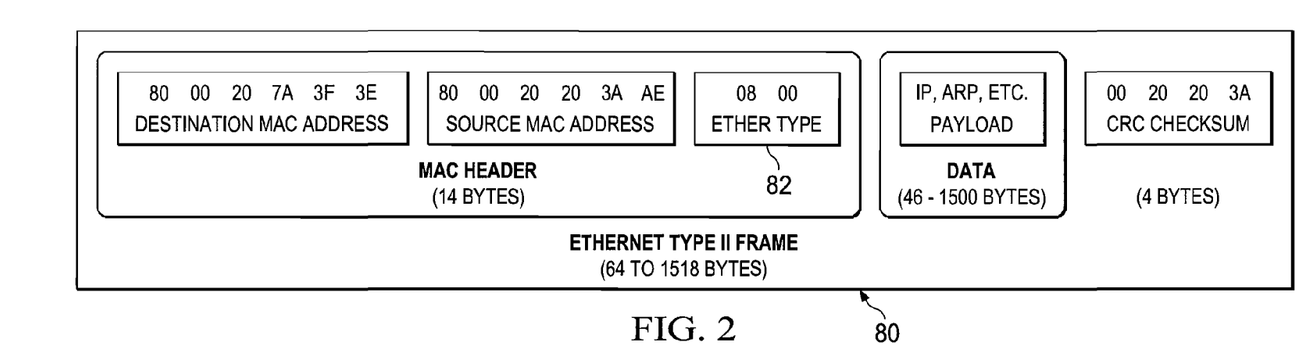
FIG. 2 is a simplified block diagram illustrating a potential frame configuration for the communication system.

FIG. 2 is a simplified block diagram of an Ethernet type II frame 80. Ethernet frame 80 may include an Ethernet type (abbreviated: Ether Type) field 82, along with a destination address, a source address, a payload, and a cyclic redundancy check (CRC) checksum. Note that most switches monitor L2 applications in order to identify an IP frame. In one embodiment, L2 and L3 devices can be instructed to alter their behavior by changing an Ethernet frame header (e.g., using a uniquely identifiable L2 Ether Type [xx]) for outgoing packets. This Ether Type [xx] designation can be sent from a near end [User 1] to a remote far end [User 2], where headers would signal L2 devices (switches) within the media stream. This notification can initiate a troubleshooting process on the media stream for L2 devices in the User 1/User 2 directions or pathways. In a similar fashion, when the far end device [User 2] receives packets with the unique Ether Type [xx], the User 2 endpoint can start sending packets with the same Ether Type [xx] back to User 1. This can initiate L2 devices to begin the real-time troubleshooting process on the media stream from User 2 to User 1.

In one particular example, the Ethernet type field 82 includes '08 00' and this represents a designated identification for particular packets. [Note that other Ethernet packet header formats (such as 802.1p) can readily be used, as FIG. 2 is just one example of a specific type of Ethernet header being employed.] If Ethernet type field 82 is changed to be something different, this can signal to the receiving device that this packet is part of a media stream that is being traced and, further, that this media stream needs quality monitoring. Note that other fields could readily be manipulated to achieve a similar result and, therefore, are included within the teachings of the present disclosure. By using various fields within Ethernet frame 80, media streams that are experiencing problems can be uniquely identified. Thus, specific fields within a given frame can be used as identifiers for upstream devices. In this instance, the particular frame is still an Ethernet frame, but an Ethernet frame whose header now indicates that the media stream to which it belongs is subject to quality monitoring. Note that the manipulation or changing of any of the fields within Ethernet frame 80 can be performed by the quality monitoring modules, as described herein.

It should also be noted that there are a number of Ethernet frame headers to which the present disclosure can apply. The one discussed with reference to FIG. 2 is referred to as Ethernet type II, and this is probably the most common type of Ethernet header. However, other Ethernet header types can readily be accommodated by communication system 10. For example, when dealing with voice and video applications, 802.1p may be more common because it typically includes the field for class of service (CoS) bits. In addition, another signaling method that can readily be accommodated by communication system 10 involves toggling the CoS bits (and/or the quality of service (QoS) bits) in an Ethernet header. These operations would offer another viable method for media tracing and signaling for troubleshooting being needed for a media stream.

Figure 3:
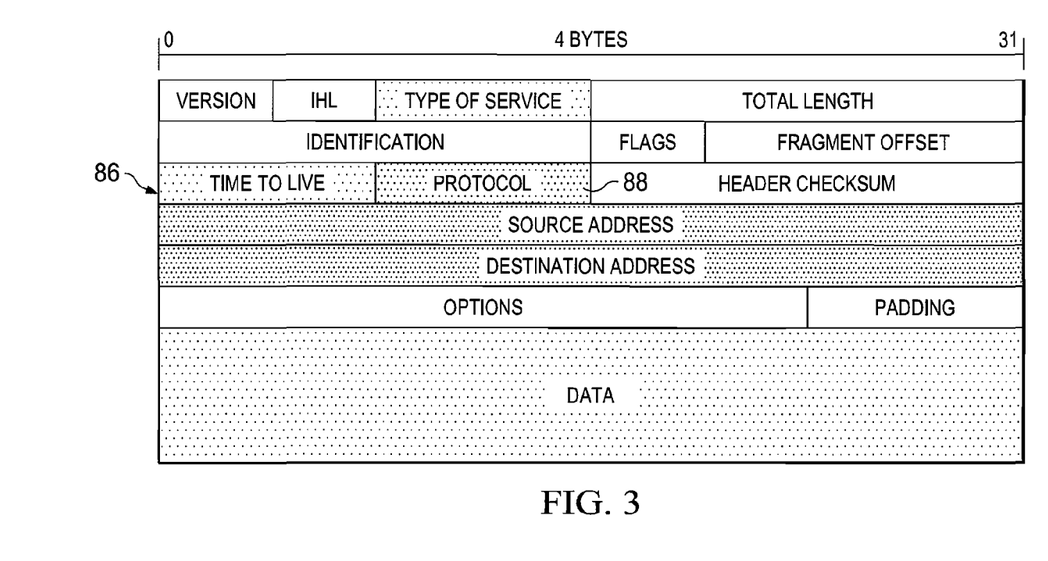
FIG. 3 is a simplified block diagram illustrating an alternative potential frame configuration for the communication system.

FIG. 3 is a simplified block diagram an IP frame 86 that includes a protocol field 88. In operation, L2 header signaling that indicates the media tracing and troubleshooting function can be mapped to an L3 header signaling method by using a specific protocol type designation. In one instance this designation is the experimental/testing [e.g., 253] protocol type, which is provided in the IP header. This can signal that the media stream containing the IP packet with this header change is being marked for troubleshooting and quality monitoring. Using a mechanism similar to the one used for tagging L2 Ethernet headers, L3 IP headers can be tagged using protocol type 253. This results in an effective signaling mapping for both an L2 and an L3 instance in the context of troubleshooting notifications. The troubleshooting notifications can travel through a complex audio and video network, where diagnostics can be triggered on specific interfaces that affect the media stream under test. Note that this intelligence associated with quality monitoring and troubleshooting can be achieved via various configurations of routers, switches, gateways, etc. These elements can be configured or programmed to respond to real-time troubleshooting notifications, as indicated by predetermined changes in the frame and packet headers within a media stream flow. The actual manipulation or changing of any of the fields within IP frame 86 can be performed by the quality monitoring modules, as described herein.

One benefit in using the proposed scheme is that the signaling is done using the existing IP media stream packets. Transit devices are readily able to detect the L2 and L3 header state changes and, further, to ensure that the mapping translates over network links (e.g., WAN links). L2 and L3 devices can detect these new Ethernet/IP frame packets as a signal to begin monitoring the media stream performance, while the media stream enters and exits each device. An out-of-band network management host can manage packet performance information for all the devices by parsing the router and switch data for packet performance issues. By analyzing this data, the management system can isolate the specific device (router/switch) that is causing (or that is located close to the source of) the packet performance issues. In addition, the management system can send the appropriate information to a network operations device or to an organization for further action (e.g., remedial activities, repairing operations, reporting, etc.).

In another embodiment, Resource Reservation Protocol (RSVP) could be utilized to map the L3 path. This could make it simpler for an agent or a network management device to initiate real-time diagnostics in the event that an endpoint experiences packet degradation. The RSVP protocol could maintain its original functionality, but L3 devices that support RSVP could have an additional notification feature. This feature could notify an agent or network management station of its participation in any media streams set up by RSVP. Subsequently, when a user or other system component detected degradation of the media stream, the agent or network management system could be notified. This notification could be as simple as a user pressing a soft-key on an IP phone, or the notification could be triggered automatically by a given device. Upon notification by a user or by the system component, the agent/network management system could initiate the applicable troubleshooting procedures for each L3 device in the media stream path.

For networks that may not want to deploy RSVP for all calls, this RSVP process could also be initiated in mid-call. Similar to that of RSVP being enabled at the beginning of each call, as the RSVP reserve (RESV) message makes its way back to the sender through the L3 devices, each of the L3 devices can register itself as a part of the IP media stream with the troubleshooting agent/network management system. Subsequently, the agent or system can begin querying and collecting the appropriate troubleshooting information for the media stream.

Another example embodiment can involve event signaling packets (e.g., Named Telephony Event (NTE) and/or Named Signaling Event (NSE) signaling packets). NTE and NSE packets can be used to signal telephony events between two endpoints within the media stream itself. This signaling method effectively bypasses the call control protocol. By introducing a unique NTE and/or NSE event associated with troubleshooting a media stream, L3 devices in the media stream path could be notified to begin monitoring and collecting troubleshooting information, as soon as the unique NTE or NSE packet is detected by each L3 transit device in the media path.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that communication system 10 of FIG. 1A (and its teachings) are readily scalable. Communication system 10 can accommodate a large number of components, as well as more complicated or sophisticated arrangements and configurations. Accordingly, the examples provided should not limit the scope or inhibit the broad teachings of communication system 10 as potentially applied to a myriad of other architectures.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain types of networks, switches, and protocols, communication system 10 may be applicable to other exchanges, routing protocols, or routed protocols in which packets and frames (not necessarily the routing protocol/packets and frames described) are exchanged in order to provide troubleshooting information to interested devices or entities. Moreover, although communication system 10 has been illustrated with reference to particular elements and operations that facilitate the communication process, these elements and operations may be replaced by any suitable architecture or process that achieves the intended functionality of communication system 10. Additionally, communication system 10 can be used for plotting streams for network management, connection admission control (CAC), and wide area network (WAN) bandwidth control applications, for example, when there are no obvious problems with the media streams. Thus, such an architecture can equally apply to systems not experiencing degradation problems.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:
1. A method, comprising:
   identifying a change in header information within a packet of a communication flow, wherein the change in the header information reflects a predetermined type of header change that signifies a degradation condition for the communication flow, wherein the degradation condition was detected at an endpoint for the communication flow;
generating a mean opinion score (MOS) for a specific media stream in the communication flow;
determining whether to indicate the degradation condition to network elements along a network path associated with the communication flow based on the MOS;
changing a header field within an outgoing frame of the specific media stream to initiate a trace through the network path;
collecting diagnostic data associated with the specific media stream in the communication flow; and
identifying particular media streams associated with the degradation condition.

2. The method of claim 1, wherein the changing of the header field includes:
changing an Ethernet header field for a layer two frame associated with the communication flow.

3. The method of claim 1, wherein the changing of the header field includes:
changing an Internet Protocol (IP) header field for a layer three frame associated with the communication flow.

4. The method of claim 1, wherein the changing of the header field includes:
changing a field within an outgoing layer three header to identify an IP socket associated with the communication flow.

5. The method of claim 1, wherein the change to the header field is propagated by one or more of the network elements along the network path associated with the communication flow.

6. The method of claim 1, wherein the change in the header information is caused by reaching a threshold associated with packet loss, jitter, or latency related to the communication flow.

7. The method of claim 1, wherein the changing of the header field is executed via an operating system command provisioned within a network element that receives the packet.

8. Logic encoded in one or more non-transitory media that includes code for execution and when executed by a processor is operable to perform operations comprising:
identifying a change in header information within a packet of a communication flow, wherein the change in the header information reflects a predetermined type of header change that signifies a degradation condition for the communication flow, wherein the degradation condition was detected at an endpoint for the communication flow;
generating a mean opinion score (MOS) for a specific media stream in the communication flow;
determining whether to indicate the degradation condition to network elements along a network path associated with the communication flow based on the MOS;
changing a header field within an outgoing frame of the specific media stream to initiate a trace through the network path;
collecting diagnostic data associated with the specific media stream in the communication flow; and
identifying particular media streams associated with the degradation condition.

9. The logic of claim 8, wherein the changing of the header field includes:
changing an Ethernet header field for a layer two frame associated with the communication flow.

10. The logic of claim 8, wherein the changing of the header field includes:
changing an Internet Protocol (IP) header field for a layer three frame associated with the communication flow.

11. The logic of claim 8, wherein the changing of the header field includes:
changing a field within an outgoing layer three header to identify an IP socket associated with the communication flow.

12. The logic of claim 8, wherein the change to the header field is propagated by one or more of the network elements along the network path associated with the communication flow.

13. The logic of claim 8, wherein the change in the header information is caused by reaching a threshold associated with packet loss, jitter, or latency related to the communication flow.

14. The logic of claim 8, wherein the changing of the header field is executed via an operating system command provisioned within a network element that receives the packet.

15. An apparatus, comprising:
a memory element configured to store data;
a processor operable to execute instructions associated with the data; and a monitoring module configured to interface with the memory element and the processor, the monitoring module being configured to:
identify a change in header information within a packet of a communication flow, wherein the change in the header information reflects a predetermined type of header change that signifies a degradation condition for the communication flow, wherein the degradation condition was detected at an endpoint for the communication flow;
generate a mean opinion score (MOS) for a specific media stream in the communication flow;
determine whether to indicate the degradation condition to network elements along a network path associated with the communication flow based on the MOS;
change a header field within an outgoing frame of the specific media stream to initiate a trace through the network path;
collect diagnostic data associated with the specific media stream in the communication flow; and
identify particular media streams associated with the degradation condition.

16. The apparatus of claim 15, wherein the monitoring module is further configured to:
change an Ethernet header field for a layer two frame associated with the communication flow.

17. The apparatus of claim 15, wherein the monitoring module is further configured to:
change an Internet Protocol (IP) header field for a layer three frame associated with the communication flow.

18. The apparatus of claim 15, wherein the monitoring module is further configured to:
change a field within an outgoing layer three header to identify an IP socket associated with the communication flow.

19. The apparatus of claim 15, wherein the change to the header field is propagated by one or more of the network elements along the network path associated with the communication flow, and wherein the change in the header information is caused by reaching a threshold associated with packet loss, jitter, or latency related to the communication flow.

* * * * *